Patented Jan. 2, 1945

2,366,169

UNITED STATES PATENT OFFICE 2,366,169

METHOD OF CANNING SWISS STEAKS

August Barth, Chicago, Ill., assignor to Danbar Packing Company, a corporation of Illinois No Drawing. Application April 23, 1942,
Serial No. 440,187

8 Claims. (Cl. 99—187)

This invention relates to methods or processes for canning meats, and more particularly to the canning of meat products such as Swiss steak and the like.

It is an object of the invention to provide improved methods for canning meats, wherein the canned product in condition for use or consumption is preserved as to identity, texture and flavor.

More specifically, it is an object of the invention to provide improved meat canning methods and processes, wherein the meat pieces, within the can, maintain their original shape, essential size and character, and without crushing, matting, or disintegration; even when subjected to a complete canning and sterilizing process.

A further object of the invention is to provide a canning process which may be successfully employed for the canning of meat products such as Swiss steaks.

In accordance with the principles of the invention, each individual meat piece within the can may be separately wrapped or partitioned from adjacent meat pieces during the canning processing by insoluble barrier means, whereby to preserve the identity, shape, and essential size and appearance of the pieces.

Various objects, advantages, and features of the invention will be apparent from the following specification and description, wherein a preferred embodiment of the invention is set forth for purposes of illustration.

In the canning of meat products, particularly of the uncured and unminced or unhashed type, considerable difficulty is encountered in avoiding mashing, disintegration or deterioration of the meat pieces and their relatively fragile fibers where the product is heated in the sealed container for a substantial period of time to cook or partially cook and/or sterilize it. This is particularly true where the product is completely canned and where, in addition to the sterilization, the cooking of the product is also conducted largely or wholly after the product is sealed within the container. The present invention provides means for overcoming these difficulties, the meat pieces not only being preserved as to identity, size and texture, but also as to flavor and appearance, and otherwise retaining the essential characteristics of the normally or freshly cooked product even where substantially a complete canning operation is performed on the meat product after it is placed in the container.

In accordance with the invention, the meat pieces to be canned to provide the canned Swiss steak are preferably selected and cut from the round or loin beef. These cuts, particularly in the mature beef, provide fibered meat pieces of maximum bonding strength, and without undue fat; and thus are possessed of the most desirable characteristics for enabling the meat pieces to withstand the canning processing, without deterioration or disintegration. The meat pieces are cut in ordinary steak form, and by way of illustrative example, may be meat slices on the order of several inches in diameter or width, and an inch or thereabouts in thickness. Such meat slices or steaks are well adapted to provide individual steak servings. They also are adapted to be readily fitted into a container such as a No. 10 size can or the like; and the several preferred process or method steps hereinafter to be described, including preferred canning temperatures, will be particularly set forth in reference to a can of this size. It is obvious, however, that cans or containers of any suitable size or character may be employed.

In effecting the processing, the cut steaks are first subjected to pre-heating and browning, before they are placed within the can. In carrying out the pre-heating and browning, the steaks are first dipped in, sprinkled with, or otherwise covered with a sealing and browning medium, preferably flour. This flour acts to seal the exposed surface cells of the meat pieces, minimizing moisture loss, shrinkage, and distortion of the pieces during the canning processing. The flour also aids in browning the steaks, and imparting flavor thereto in the finished product. The flour further aids in thickening the gravy to be applied to the steaks, and imparts thereto, the flavor and appearance present in a normally and properly cooked Swiss steak.

After the steaks have been properly coated with flour they are subjected to pre-heating and browning by being subjected to the action of a hot bath of grease or fat, preferably beef, pork, or vegetable fat or oil. Preferably also the steaks are completely immersed in the fat, being subjected to a "deep fat" pre-heating and browning action. This pre-heating and browning operation sears and thus further seals the meat cells against undue moisture loss in the subsequent canning operations. It also, in conjunction with the flour, browns the steaks, and imparts flavor thereto. It further eliminates air from the meat pieces, and thus aids in the subsequent sterilizing and canning processes.

This pre-heating and browning of the steaks is not a cooking operation, and care must be observed to insure that the steaks are not subjected to any substantial cooking action at this time. Preferably the fat or oil is heated to a minimum temperature approximating 250 degrees Fahrenheit, and the steaks are left in the pan in the fat bath not to exceed five minutes, or thereabouts. By this means the steaks are pre-heated throughout, perhaps to an inside temperature approximating 150 degrees Fahrenheit, and they are browned; but they are not subjected at this time to any essential or substantial cooking when they are to be cooked and sterilized in the sealed container in accordance with the preferred method. Any substantial cooking at this time, when coupled with the further cooking which takes place after the steaks have been introduced into the cans and subjected to the canning processing, might destroy the binding quality and texture of the relatively fragile meat fibers, thus endangering the quality of the finished product.

After the pre-heating and browning of the steaks, they are removed from the oil or fat bath and individually wrapped in an insoluble wrapping medium, preferably vegetable parchment paper; which acts as an effective barrier means between the steaks in the can, as they are subjected to the more severe heating and cooking canning operation. This is a preferred step in the method of the invention, and by virtue of it, in conjunction with the other features set forth, the individual identity, shape, and character of the meat pieces, as steaks, is insured in the finished product.

The vegetable parchment paper is insoluble, non-absorbent, and does not disintegrate under the canning process. It is not essential that the steaks be completely wrapped in the paper, but it is desirable that all adjacent or otherwise contacting meat pieces be separated by the paper barrier wall. By this means each meat piece is preserved out of contact with all adjacent pieces with the result that heat applied to the container penetrates well through the mass of meat pieces and even though the steaks are subjected to a complete cooking, canning and sterilizing process, there is no possibility of the meat pieces becoming matted together, and thus distorted into an unsightly, undesired hashed or commingled mass.

After wrapping in the parchment paper, and while the steaks are still hot, they are placed or arranged in the can, which can has been previously filled a predetermined fractional amount, approximately one-third in ordinary instances, with a beef stock gravy at a temperature approximating the boiling point, or 212 degrees Fahrenheit. The beef stock gravy may be made by cooking beef bones, with water, and suitably flavoring with celery, onions, salt, pepper, et cetera, as may be desired. The gravy may also have been thickened if desired, as with flour.

It is desirable that the gravy within the cans be as close to the boiling point as possible, as there is necessarily some dissipation of heat or heat loss during the filling process, and it is important that the steaks and other contents within the can be sealed at a suitably high temperature, preferably not less than 180 degrees Fahrenheit where they are to be completely canned. This relatively high sealing temperature insures the maintained absence of air from the meat pieces, and insures the complete sterilizing of the product in the subsequent canning processing.

After the desired number of steaks have been placed or arranged in the can, in the bath of gravy, and wrapped or separated by the parchment paper, as above described, the can is filled with gravy to a point substantially full, but somewhat displaced from the top, on the order of a small fraction of an inch, after which the can is closed and sealed by suitable apparatus, as will be understood by those skilled in the art. Vacuum sealing is unnecessary, although it may be utilized if desired.

The sealed can is then placed in a retort in which it is subjected to a canning processing. To this end steam may be introduced into the retort at a suitable temperature and pressure to effect the canning processing. Preferably in the described embodiment steam may be introduced into the retort at a pressure approximating ten pounds above atmospheric pressure, and at a temperature approximating 240 degrees Fahrenheit. In the described embodiment, the cans are subjected to this temperature for three hours. Adequate cooking of the steaks may occur in approximately one hour, but the processing for three hours insures complete sterilization and canning of the product, so that partial refrigeration of the cans in storage is not required.

At the end of the three hour heating period the cans are removed from contact with the heating medium, and immediately subjected to the action of a cooling medium, such as cold water, to stop the cooking process. During the cooling, the application of external pressure on the cans is preferably maintained. The quick cooling insures that the cooking of the steaks, even at the center of the can, will cease at the desired time, thus precluding spoilage due to continued partial cooking of the product at any point within the can.

After cooling, the processed cans are preferably allowed to stand for a minimum of a week or so to permit the product to "set," before it is used. However, in accordance with the process hereinbefore set forth, a complete canning of the steaks has been effected so that the cans will keep indefinitely, and without even partial refrigeration, without product deterioration.

In use, as the cans are opened, the steaks may be unwrapped from their parchment paper coverings, and heated and served in the ordinary manner, with a suitable quantity of the covering gravy. As served, the steaks will have their identity preserved, and will have retained substantially their original size, shape, and texture, and will be possessed of the flavor and characteristics of Swiss steaks cooked and served in conventional manner. There will be no matting, disintegration, or hashing of the meat pieces.

The foregoing description sets forth in detail the preferred method for preparing canned Swiss steaks in accordance with this invention. It may be seen that it involves the complete canning of the steaks including sterilization to the point where the canned product may be stored for long periods of time without refrigeration. It also involves conducting substantially all of the cooking operation within the sealed can. This latter step has the particular advantage that it avoids the shrinkage loss which normally occurs in cooking meat in open or unsealed vessels. When the Swiss steaks are cooked in the sealed container in accordance with the preferred method described above, substantially no shrinkage loss occurs.

While the maximum advantage of the present invention is attained by operation in accordance with the preferred method, it is to be understood that the invention is not limited thereto. The advantages of the invention such for example as those resulting from arranging the food pieces within a container with insoluble barrier members such as vegetable parchment paper therebetween are attained particularly in the case of Swiss steaks even though the steaks are not heated within the sealed container for a period of time sufficient to effect complete cooking and sterilization, that is, complete canning. Thus, the invention contemplates a partial canning operation as well as a complete canning. For example, the steaks may be merely cooked within the container without continuing the heating to the point where they are sterilized completely and then stored with refrigeration, or only a portion of the cooking may be conducted within the container, or the steaks may be merely sterilized after being sealed within the container, the cooking operation being conducted in some other manner than that described above.

Within the broad scope of the invention the steps of the preferred method outlined above may thus be varied considerably. This is particularly true with respect to the time of heating within the sealed container and the temperature of this heating. Where the steaks are not completely cooked and sterilized within the container, it will be clear that a shorter heating time may be used. It is pointed out above that adequate cooking of the steaks may occur in approximately one hour. This time varies considerably with different steaks, some relatively tender steaks being cooked in considerably less time, for example, in about thirty minutes. The heating time within the container may also be greater than that set forth above even in the preferred method. While it has been found that three hours heating at 240 degrees Fahrenheit effects a complete sterilization and cooking, the sterilizing time to be employed in commercial canning operations of products to be shipped in interstate commerce is prescribed by Federal authorities and usually substantially exceeds the actual time required for complete sterilization. Thus, although sterilization may be complete in three hours, the sterilization standard set up may require five hours. As is well understood, sterilization is a function of both time and temperature. Accordingly, if a higher temperature, for example, 260 degrees Fahrenheit (corresponding to twenty pounds pressure in saturated steam) is employed, the time for complete canning will be correspondingly decreased.

It will thus be seen that in accordance with the present invention canning methods are provided which may be used to effect the partial or complete canning and sterilization of uncured meat pieces, in the form of whole steaks or the like, wherein the relatively fragile meat fibers are preserved in whole form, the initially tougher beef fibers being tenderized during the preferred canning processing, but not destroyed or disintegrated. In the finished product the original whole form of the meat pieces is preserved and a Swiss steak is provided having the characteristics, including both the appearance and the texture and the flavor, of the conventionally cooked product.

The use of the insoluble barrier means insures that the steaks will not only be cooked through during any cooking operation within the container, but also insures that they will not be matted, disintegrated or hashed, and can be removed from the container in whole form for use.

It is obvious that various changes may be made in the specific embodiment of the invention herein specifically set forth for purposes of illustration without departing from the spirit of the invention. Accordingly, the invention is not to be limited to the specific embodiment and method steps set forth, but only as indicated in the following claims.

The invention is hereby claimed as follows:

1. The method of canning Swiss steaks which comprises selecting a plurality of mature, relatively lean, beef cuts of steak size, applying flour to the surfaces of the steaks, preheating and browning the steaks in a bath of deep fat but without cooking of the steaks, isolating the steaks individually one from the others with sheets of vegetable parchment paper, preparing a beef stock gravy comprising beef juices, flour, and seasoning, introducing the steaks, paper, and a bath of gravy at a temperature approximating the boiling point into a canning container, closing and sealing the container, and thereafter subjecting the container to the action of sufficient heat to effect a canning operation.

2. The method of canning Swiss steaks which comprises selecting a plurality of mature, relatively lean, beef cuts of steak size, applying flour to the surfaces of the steaks, preheating and browning the steaks in the presence of fat but without cooking of the steaks, isolating the steaks individually one from the others with sheets of paper, preparing a beef stock gravy comprising beef juices, flour, and seasoning, introducing the steaks, paper, and a bath of said gravy at a temperature approximating the boiling point into a canning container, closing and sealing the container, and thereafter subjecting the container to the action of sufficient heat to effect a canning operation.

3. The method of canning Swiss steaks which comprises preparing a plurality of beef cuts of steak size, preheating and browning the steaks in the presence of fat but without cooking of the steaks, isolating the steaks individually one from the others with a plurality of insoluble barrier members interposed between the steaks, preparing a beef stock gravy comprising beef juices, flour, and seasoning, introducing the steaks, barrier members, and a bath of said gravy at a temperature approximating the boiling point into a canning container, closing and sealing the container, and thereafter subjecting the container to the action of sufficient heat to effect a canning operation.

4. The method of canning Swiss steaks which comprises preparing a plurality of meat cuts of steak size, preheating and browning the steaks in the presence of fat but without cooking of the steaks, isolating the steaks individually one from the others with a plurality of insoluble barrier members interposed between the steaks, preparing a meat stock gravy comprising meat juices, flour, and seasoning, introducing the steaks, barrier members, and a hot bath of said gravy into a canning container, closing and sealing the container, and thereafter subjecting the container to the action of sufficient heat to effect a canning operation.

5. The method of canning Swiss steaks which comprises selecting a plurality of mature, relatively lean, beef cuts of steak size, applying flour to the surfaces of the steaks, preheating and browning the steaks in a bath of deep fat but without cooking of the steaks, preparing a beef stock gravy comprising beef juices, flour, and seasoning, introducing the steaks and a bath of said gravy at a temperature approximating the boiling point into a canning container, closing and sealing the container, and thereafter subjecting the container to the action of sufficient heat to effect a canning operation.

6. The method of canning Swiss steaks which comprises selecting a plurality of mature, relatively lean, beef cuts of steak size, applying flour to the surfaces of the steaks, preheating and browning the steaks in the presence of fat but without cooking of the steaks, preparing a beef stock gravy comprising beef juices, flour, and seasoning, introducing the steaks and a bath of said gravy at a temperature approximating the boiling point into a canning container, closing and sealing the container, and thereafter subjecting the container to the action of sufficient heat to effect a canning operation.

7. The method of canning Swiss steaks which comprises preparing a plurality of beef cuts of steak size, preheating and browning the steaks in the presence of fat but without cooking of the steaks, preparing a beef stock gravy comprising beef juices, flour, and seasoning, introducing the steaks and a bath of said gravy at a temperature approximating the boiling point into a canning container, closing and sealing the container, and thereafter subjecting the container to the action of sufficient heat to effect a canning operation.

8. The method of canning Swiss steaks which comprises preparing a plurality of meat cuts of steak size, preheating and browning the steaks in the presence of fat but without cooking of the steaks, preparing a meat stock gravy comprising meat juices, flour, and seasoning, introducing the steaks and a hot bath of said gravy into a canning container, closing and sealing the container, and thereafter subjecting the container to the action of sufficient heat to effect a canning operation.

AUGUST BARTH.